United States Patent
Bertolotti et al.

(10) Patent No.: US 9,422,919 B2
(45) Date of Patent: Aug. 23, 2016

(54) REDUNDANT PITCH SYSTEM

(75) Inventors: Fabio Bertolotti, Bad Bentheim (DE); Hermann Kestermann, Rheine (DE); Jens Van Schelve, Schüttorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 1018 days.

(21) Appl. No.: 13/581,737

(22) PCT Filed: Feb. 24, 2011

(86) PCT No.: PCT/EP2011/052726
§ 371 (c)(1),
(2), (4) Date: Aug. 29, 2012

(87) PCT Pub. No.: WO2011/110429
PCT Pub. Date: Sep. 15, 2011

(65) Prior Publication Data
US 2012/0321473 A1 Dec. 20, 2012

(30) Foreign Application Priority Data

Mar. 10, 2010 (DE) .......................... 10 2010 010 958

(51) Int. Cl.
*F03D 7/04* (2006.01)
*F03D 1/06* (2006.01)
(Continued)

(52) U.S. Cl.
CPC .............. *F03D 7/0224* (2013.01); *F03D 80/00* (2016.05); *F05B 2260/70* (2013.01); *F05B 2260/79* (2013.01); *Y02E 10/721* (2013.01); *Y02E 10/722* (2013.01); *Y02E 10/723* (2013.01)

(58) Field of Classification Search
CPC ...... F03D 7/042; F03D 7/0224; F03D 11/00; Y02E 10/723; F05B 2260/74; F05B 2260/75; F05B 2260/76; F05B 2270/328
See application file for complete search history.

(56) References Cited

U.S. PATENT DOCUMENTS

| 3,647,038 A | 3/1972 | Balz | |
| 6,921,985 B2* | 7/2005 | Janssen | F03D 7/0224 290/44 |
| 7,317,261 B2* | 1/2008 | Rolt | B64C 39/022 244/24 |

(Continued)

FOREIGN PATENT DOCUMENTS

| DE | 20 10 431 B1 | 11/1970 |
| DE | 197 52 241 C2 | 8/2000 |

(Continued)

OTHER PUBLICATIONS

International Search Report (in German with English translation) and Written Opinion (in German) for PCT/EP2011/052726, mailed Apr. 3, 2012; ISA/EP.

(Continued)

*Primary Examiner* — Dwayne J White
*Assistant Examiner* — Julian Getachew
(74) *Attorney, Agent, or Firm* — Harness, Dickey & Pierce, P.L.C.

(57) ABSTRACT

A pitch system for a wind turbine installation having an electrically driven pitch drive associated with each rotor blade and an electric motor arranged in a rotating part of the wind turbine installation for blade adjustments. A power and control unit is associated with the motor and has line connections for the transmission of power and control data from the power and control unit to the motor and vice versa. The line connections are passed via a first rotating bushing arranged at a connecting point between the rotating part and an axially adjacent stationary region. The pitch system also includes second rotating bushing which operates mechanically and electrically separately from the first rotating bushing and is connectable to the power and control unit and to the motor for maintaining reliable transmission of the power and control data if the first rotating bushing fails.

23 Claims, 7 Drawing Sheets

Figure 1A:
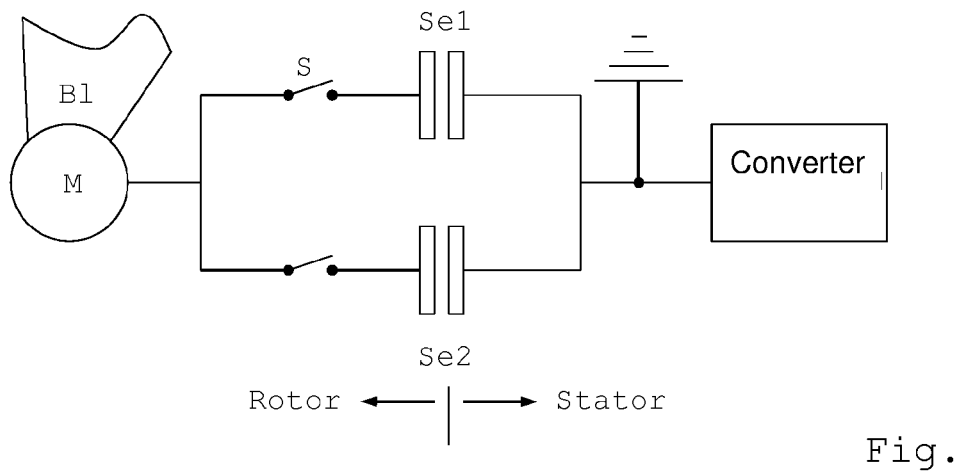

(51) Int. Cl.
*F03D 11/00* (2006.01)
*F03D 7/02* (2006.01)

(56) References Cited

U.S. PATENT DOCUMENTS

| | | | |
|---|---|---|---|
| 7,355,294 B2* | 4/2008 | Teichmann | F03D 7/0224 290/44 |
| 2007/0267872 A1* | 11/2007 | Menke | F03D 7/0224 290/44 |
| 2009/0134624 A1 | 5/2009 | Kerber | |
| 2009/0320279 A1* | 12/2009 | Jayko | H02K 15/0006 29/732 |

FOREIGN PATENT DOCUMENTS

| | | |
|---|---|---|
| DE | 200 20 232 U1 | 1/2002 |
| DE | 201 16 756 U1 | 1/2002 |
| DE | 101 16 011 A1 | 5/2002 |
| DE | 603 11 896 T2 | 10/2007 |
| EP | 0 858 148 A1 | 8/1998 |
| EP | 1 903 213 A2 | 3/2008 |
| JP | 2006-077657 A | 3/2006 |
| WO | WO-02/44561 A1 | 6/2002 |
| WO | WO-2005/021962 A1 | 3/2005 |
| WO | WO-2006/069573 A1 | 7/2006 |
| WO | WO-2009/008863 A1 | 1/2009 |

OTHER PUBLICATIONS

International Preliminary Report on Patentability (Chapter I of the Patent Cooperation Treaty) for PCT/EP2011/052726, issued Sep. 25, 2012.

* cited by examiner

REDUNDANT PITCH SYSTEM

CROSS-REFERENCE TO RELATED APPLICATIONS

This application is a 371 U.S. National Stage of International Application No. PCT/EP2011/052726, filed Feb. 24, 2011, and claims priority to German Patent Application No. 10 2010 010 958.4 filed Mar. 10, 2010, the disclosures of which are herein incorporated by reference in their entirety.

The invention relates to a pitch system for a wind turbine, comprising at least one electrically driven pitch drive which is associated with each rotor blade of the turbine and which has at least one electric motor which is arranged in a rotating portion of the turbine for blade adjustment and a power and control unit which is associated with the motor and which has line connections for transmitting energy and control data from the power and control unit to the motor and vice versa, the line connections being guided by means of a rotary feedthrough which is arranged at a connection location between the rotating portion and an axially adjacent fixed region.

Modern wind turbines comprise rotor blades which are rotatably supported on a rotor and which can vary the flow angle of the wind in a relative manner for each rotor blade by means of individual adjustment of the blade angle (pitch system). In addition to the energy-efficient adjustment of the rotor blades for optimal conversion of kinetic energy into electrical energy, such a pitch system also has a safety function, since immediate adjustment of the rotor blades into the parking or feathered position allows the prevention of inadmissible rotation movements of the rotor or inadmissible exceeding of stability values in the entire turbine. Under extreme weather conditions with strong gusts of wind, the pitch system is consequently the fastest working brake of the turbine. For this reason, high demands are placed on the reliability of the pitch system. In accordance with the relevant provisions and guidelines for public and privately organised monitoring organisations for the safety of wind turbines, the availability of a wind turbine must be ensured, even in the event of failure or partial failure of components of the pitch system.

In wind turbines having three rotor blades, and a pitch system which is individually associated with each rotor blade, in the event of failure of one pitch system, the other two pitch systems can ensure sufficient redundancy. However, this becomes problematic with only two rotor blades in which, in the event of a failure of a pitch system, only one other pitch system has to carry out the safety function. This is not considered to be sufficient for a redundancy.

DE 603 11 896 T2 sets out in generic form a redundant pitch system having at least two convertors which are provided as a power control unit for controlling the pitch system. Only one convertor is associated with each drive, respectively. In the event of a failure of a pitch system, the second convertor is activated by means of a switch device.

DE 101 16 011 A1 sets out a wind turbine having a redundant pitch system. The system has more than one drive (motor) for a rotor blade, the second drive being able to be switched on in addition by means of a switching device in the event of the failure of a drive.

One of the most sensitive components of the pitch system is the so-called rotary feedthrough or slip ring arrangement, in which energy and control data are transmitted from the rotating portion of the turbine to the fixed portion and vice versa.

A rotary feedthrough for power transmission in wind turbines is disclosed, for example, in DE 201 16 756 U1. The known arrangement comprises a two-part ring housing, in which there are one or more assembled, repeatedly opening and radially rotatable insulating housings which engage one inside the other and which are insulated with respect to each other. In the insulating housing, two slip rings are further rotatably supported with respect to each other. The two insulating housings are supported together with springs on an internal sleeve which acts as a bearing shaft and are axially secured in an outer sleeve of this ring housing. The two sleeves of the carrying ring housing are pushed axially one inside the other and secured and rotated through 360°. The insulating housings are pressed together with slip rings and springs between the two sleeves of the carrying ring housing in a releasable and axially resilient manner.

Generally, rotary feedthroughs or slip ring arrangements are subjected to very high electrical and mechanical loads. In the event of failure or malfunction of these components, the safety function of the pitch system is non-operational, in particular for those components of the system which are arranged in the rotating portion of the turbine. This relates to the drive motor and the components of the convertor which are arranged in the rotating portion.

DE 197 52 241 C2 sets out a generator for supplying electrical power to consumers in an on-board network of a vehicle. The generator has a two-wire stator winding for alternating current, two galvanically separated stator windings and an exciter winding having a controller. The exciter winding, with which an additional controller is associated parallel with the first controller, is supplied with electrical power by a separate brush pair of mutually independently operating slip rings, respectively.

The prior art involving redundant pitch systems for wind turbines does not provide sufficient operational reliability with respect to a failure of the rotary feedthrough or the slip ring unit. An object of the invention is therefore to provide a redundant pitch system which also provides adequate operational reliability of the system with respect to a malfunction of the rotary feedthrough.

This object is achieved according to the invention with a pitch system according to claim 1. Advantageous developments of the invention will be appreciated from the dependent claims.

There is consequently provided according to the invention a pitch system for a wind turbine comprising at least one electrically driven pitch drive which is associated with each rotor blade of the turbine and which has at least one electric motor which is arranged in a rotating portion of the turbine for blade adjustment and a power and control unit which is associated with the motor and which has line connections for transmitting energy and control data from the power and control unit to the motor and vice versa, the line connections being guided via a rotary feedthrough which is arranged at a connection location between the rotating portion and an axially adjacent fixed region, and the system having an additional rotary feedthrough which functions mechanically and electrically separately from the first rotary feedthrough and which is connected or can be connected to the power and control unit and the motor in order to maintain reliable transmission of the energy and control data in the event of a failure of the first rotary feedthrough.

The rotating portion is formed in particular by a rotor and/or rotor shaft of the wind turbine. The fixed region, which is also referred to as a stator in this instance, is formed for example, by a machine housing and/or a machine carrier of the wind turbine. The rotating portion is in particular rotatably supported in or on the fixed region.

The notion of the invention is also to expand the redundancy of the system to the rotary feedthrough as the most sensitive component of the pitch system. Consequently, the redundancy does not extend only to the rotating portions of the pitch system but also to other components which are arranged in the stator. According to the prior art, another redundant component would be required for this purpose.

The redundant pitch system according to the invention accordingly has another rotary feedthrough which operates mechanically and electrically separately from the first rotary feedthrough and which is connected to the power and control unit and the motor. In the event of failure of the first rotary feedthrough, reliable transmission of the energy and control data is consequently maintained via the second rotary feedthrough. The turbine can consequently initially continue to be operated, the malfunctioning rotary feedthrough being able to be replaced or repaired at the next due maintenance cycle of the wind turbine.

Reliable switching off of the turbine is also ensured since, owing to the two rotary feedthroughs, the energy and control flow from the drive to the power and control unit is ensured at all times. Consequently, it is also ensured that an emergency switching off operation can be initiated by the adjustment of a rotor blade which is connected to the drive being able to be rotated into the feathered position or parking position by means of the drive.

In an advantageous embodiment, there is provision for the line connections between the motor and the power and control unit to be carried out by means of mechanically and electrically separated line guides. This is particularly advantageous in the region of the two rotary feedthroughs. Owing to this arrangement, it is ensured that an electrical short-circuit or mechanical damage owing to fire or heat in one of the line guides does not have any effect on the other line guide.

The two rotary feedthroughs may be arranged spatially on the one hand in a parallel manner beside each other or coaxially with spacing from each other or, alternatively, axially one behind the other in series and with spacing from each other, in this arrangement the first rotary feedthrough being arranged in the region of the end face of the rotating portion facing the rotor blade and the second rotary feedthrough being arranged at the opposing end face.

In a preferred arrangement, however, it is advantageous, owing to limited space conditions at the top of the machine housing, to arrange both rotary feedthroughs in an adjacent manner axially one behind the other. They can then advantageously be surrounded by a common housing. This housing is constructed in such a manner that it is sealed with respect to dirt and moisture.

The two redundant rotary feedthroughs are conventionally constructed as two similarly constructed slip ring units, each unit comprising an individual housing, slip rings and contact arms which can be pressed onto the rings in order to transmit the energy and control data.

The pressing force of the contact arms of one or both slip ring units may advantageously be made adjustable by means of a pressure reduction device on the slip rings. The pressure reduction device used comprises magnetic/electromagnetic devices which, in the absence of an energy and/or control signal, produce a contact pressure which forms contact or which interrupts contact. The slip rings are therefore in a type of "standby mode" as soon as the magnet or the magnetic device is activated. The contact arms are moved from the contact position, for example, by means of magnetic force, in order to reduce the pressure between the contact arms and the slip rings. Owing to this reduction as far as the contact pressure being released, the service-life of the slip ring unit is extended. However, with reduced contact pressure, the slip rings can no longer transmit the full power flow.

During normal operation, only one slip ring unit is inactive in each case during pressure reduction. The additional slip ring unit is fully active. For safety reasons, it is further advantageous to construct the magnetic or electromagnetic devices in such a manner that, in the event of a voltage or magnetisation drop, the contact arms are pressed back to a full contact pressure by means of a restoring device, for example, in the form of a restoring spring.

In order to ensure a redundant line connection, the first rotary feedthrough is advantageously supported on a first sleeve and the second rotary feedthrough is supported on an additional sleeve, the latter being arranged coaxially with respect to the former, the line inlet or outlet of the first rotary feedthrough being carried out in the radially extending external annular space formed by the diameter difference and the other inlet or outlet being provided in the radial inner space of the inserted and/or inner sleeve.

In order to further increase the redundancy of the system, the convertor may advantageously have an uninterruptible power supply (UPS). Such a device is known, for example, from U.S. Pat. No. 6,921,985 B2.

It is possible to consider direct current motors, alternating current motors and three-phase motors as an electric motor being used as the drive.

In a first advantageous arrangement, only the electric motor of the pitch drive is arranged in the rotating portion of the wind turbine, and the associated power and control unit is arranged with other components in the fixed region, the associated power and control unit being connected to one of the two rotary feedthroughs by means of a switching device. In the fixed region, it is advantageously possible to provide the components of the convertor associated with the motor with an emergency power supply device which is connected to an independent energy source (battery, capacitor) and which, in the event of a malfunction of the power and control unit, in particular when the power supply of the power and control unit is interrupted, maintains the power supply via the redundant slip ring units.

When direct current motors are used, two line connections are required to guide the direct current; the same applies to alternating current. With three-phase current motors, three line connections are required.

The pitch system preferably comprises one or at least one convertor which has or which forms the power and control unit. For example, the power and control unit is constructed as a convertor.

According to a development of the invention, the pitch system comprises a plurality of convertors which each have or form a power and control unit. For example, the power and control units are each constructed as convertors.

The or each of the convertors comprises as components in particular a rectifier, a power control unit and preferably also other components. Advantageously, the or each of the convertors is provided with the or with an emergency power supply device and/or is electrically connected thereto.

In an alternative embodiment, the arrangement of the components of the convertor is arranged both in the rotating portion and in the fixed region. In this "split" arrangement of the convertor, the power control unit of the convertor is arranged directly on the motor, that is to say, in the rotating portion, but the rectifier and the other components of the convertor and the emergency power supply device are arranged in the fixed region. This arrangement is particularly advantageous with direct current motors as a drive. Consequently, the number of line connections and slip ring units can be minimised. Only two lines are required for a motor in each case. The split arrangement can further also be used with alternating current or three-phase current motors with appropriate adaptation of the convertors or rectifiers.

In order to further increase the redundancy of the system, it is advantageously possible to associate with each power and control unit at least one additional power and control unit which, in the event of failure of the first power and control unit, is switchably connected to the associated motor of the first power and control unit. Thus, for example, in the case of three motors, there may be provided three power and control units whose line connections are guided via the first rotary feedthrough, and there may be provided three additional independently operating power and control units whose line connections are guided via the second rotary feedthrough and are switchably connected to each of the three motors. The power and control units are preferably each constructed as convertors.

According to a development, the wind turbine has a plurality of, in particular two or three, rotor blades. In this instance, the pitch system according to the invention preferably comprises a plurality of electrically driven pitch drives which are associated in particular with one of the rotor blades, respectively. Each of the pitch drives advantageously has at least one electric motor which is arranged in the rotating portion of the turbine for blade adjustment and a power and control unit which is associated with the motor and which has line connections for transmitting energy and control data from the power and control unit to the motor and vice versa. The line connections of each pitch drive are guided via one (the first) rotary feedthrough. Furthermore, the additional rotary feedthrough is connected or can be connected to each power and control unit and each motor in order, in the event of failure of the first rotary feedthrough, to maintain reliable transmission of the energy and control data of each pitch drive.

The invention further relates to a wind turbine having at least two rotor blades and a pitch system according to the invention. This pitch system may be developed in accordance with all the configurations set out.

Figure 2:
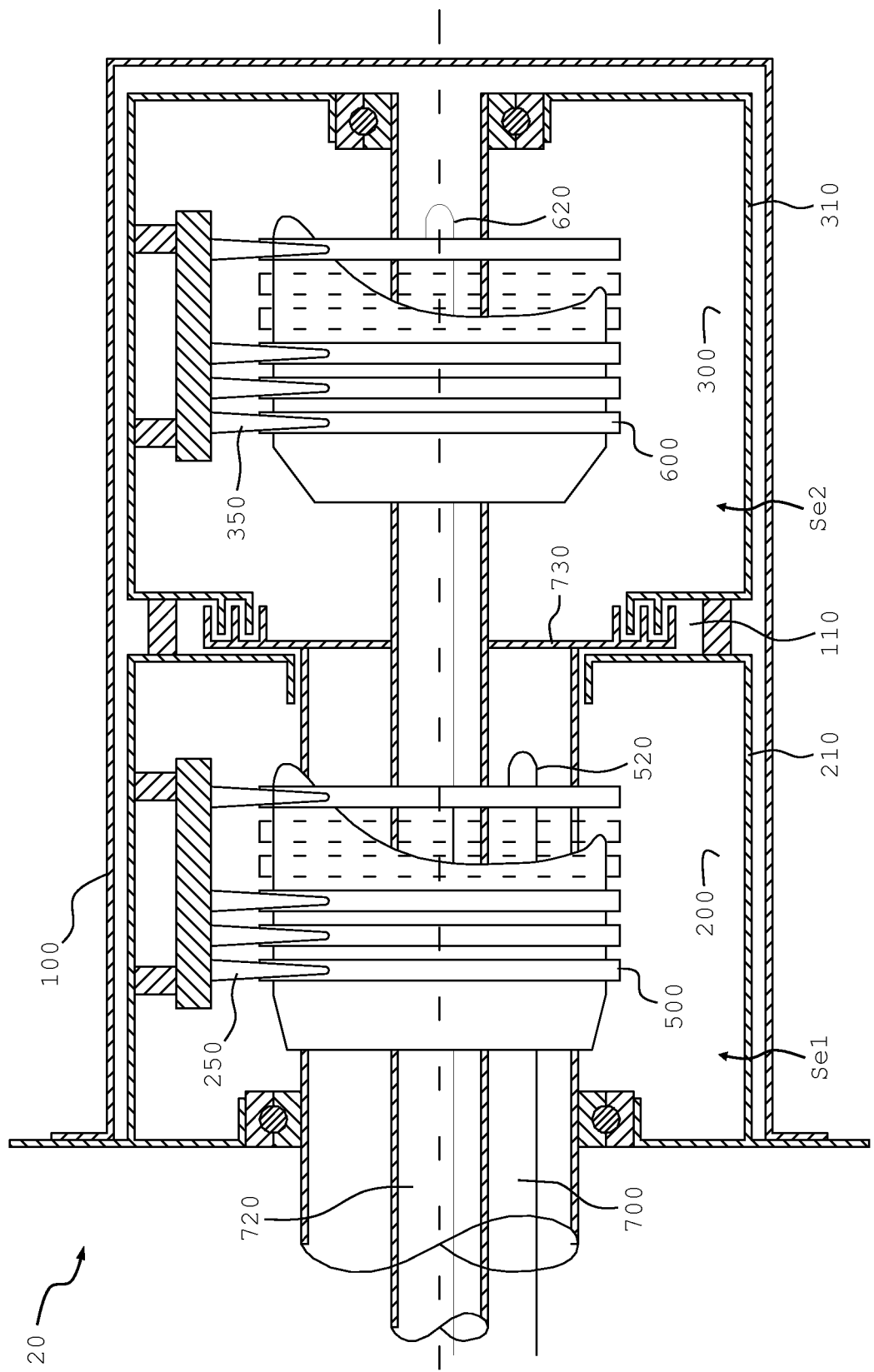
Figure 3:
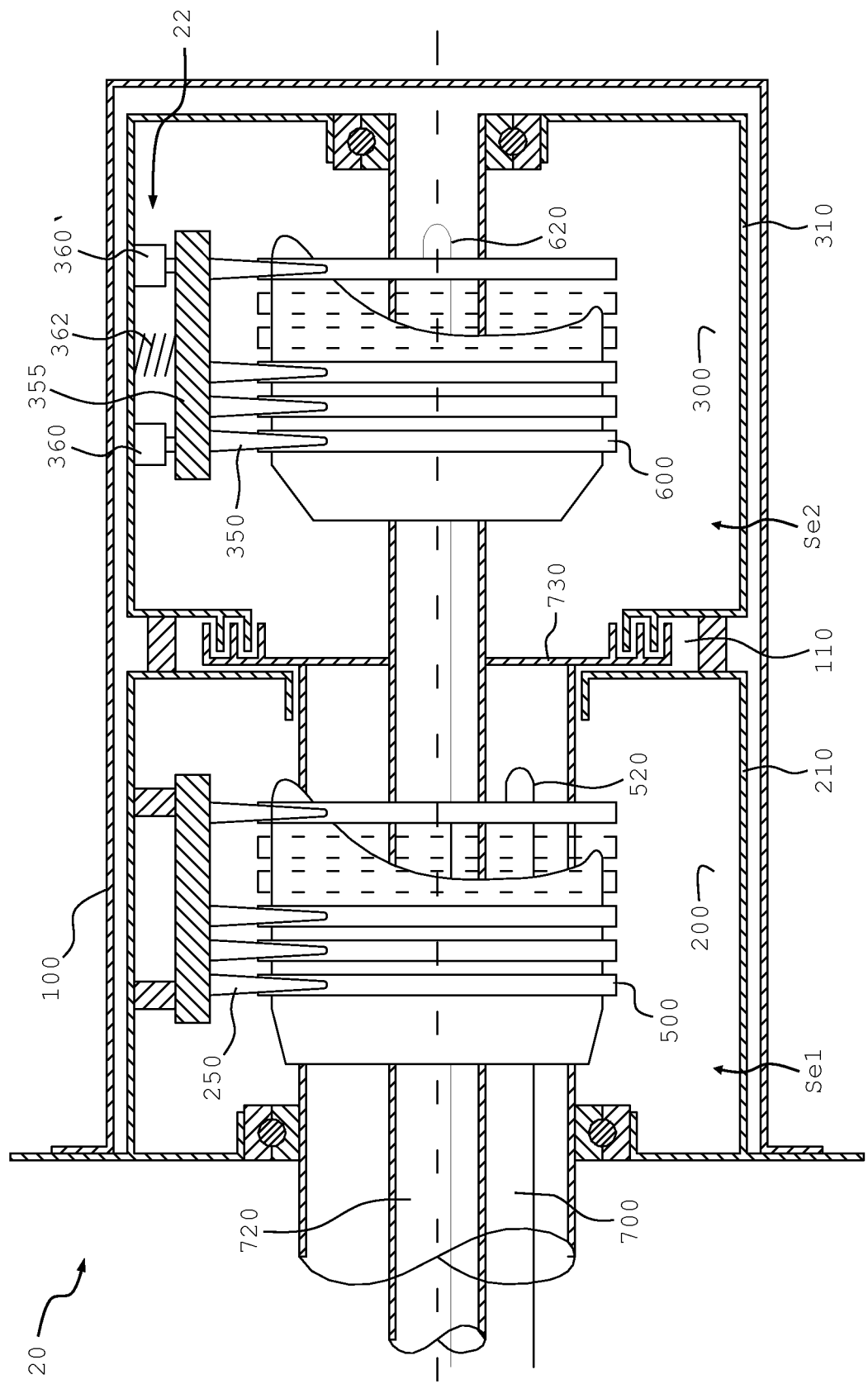
Figure 4:
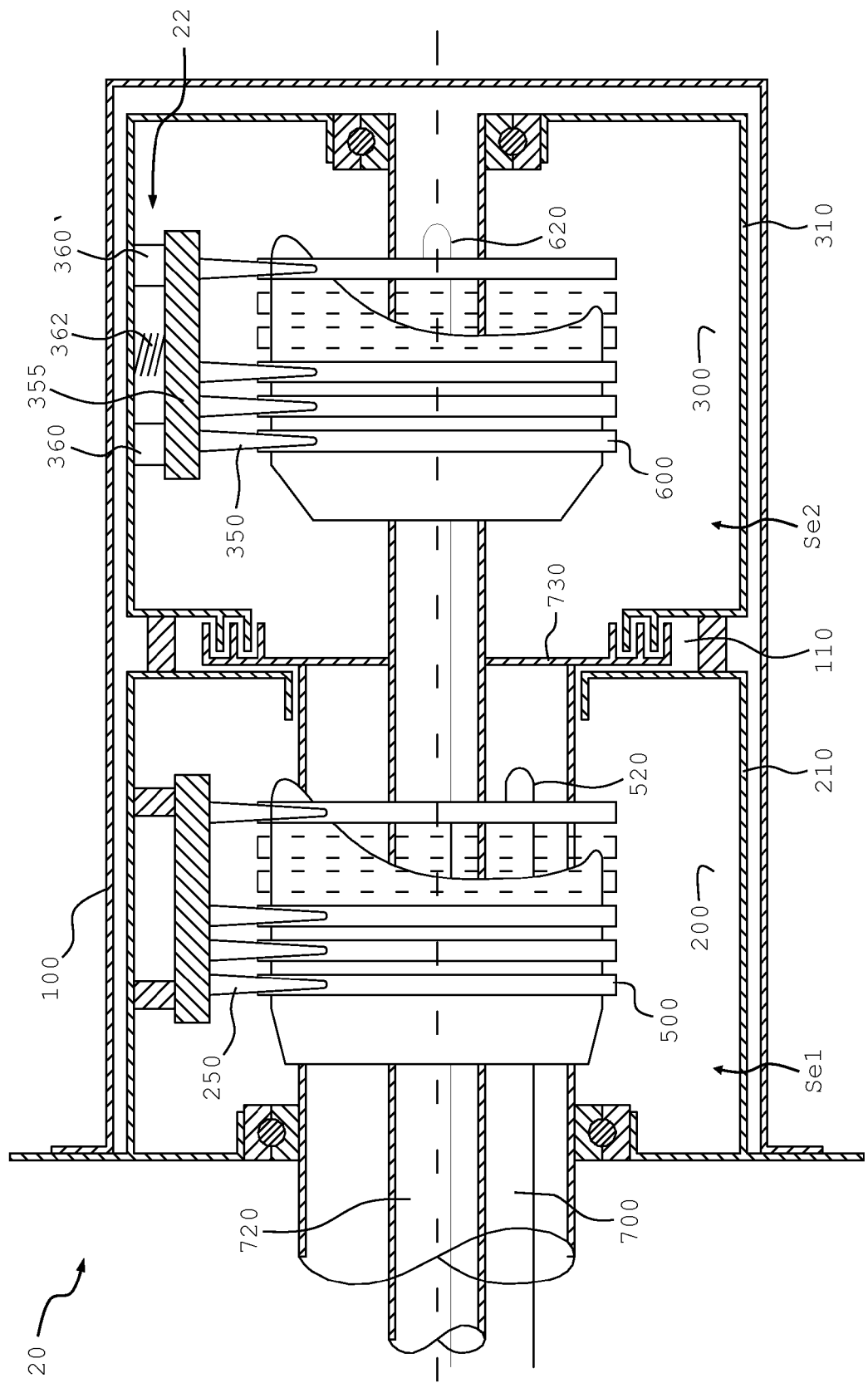
Figure 5:
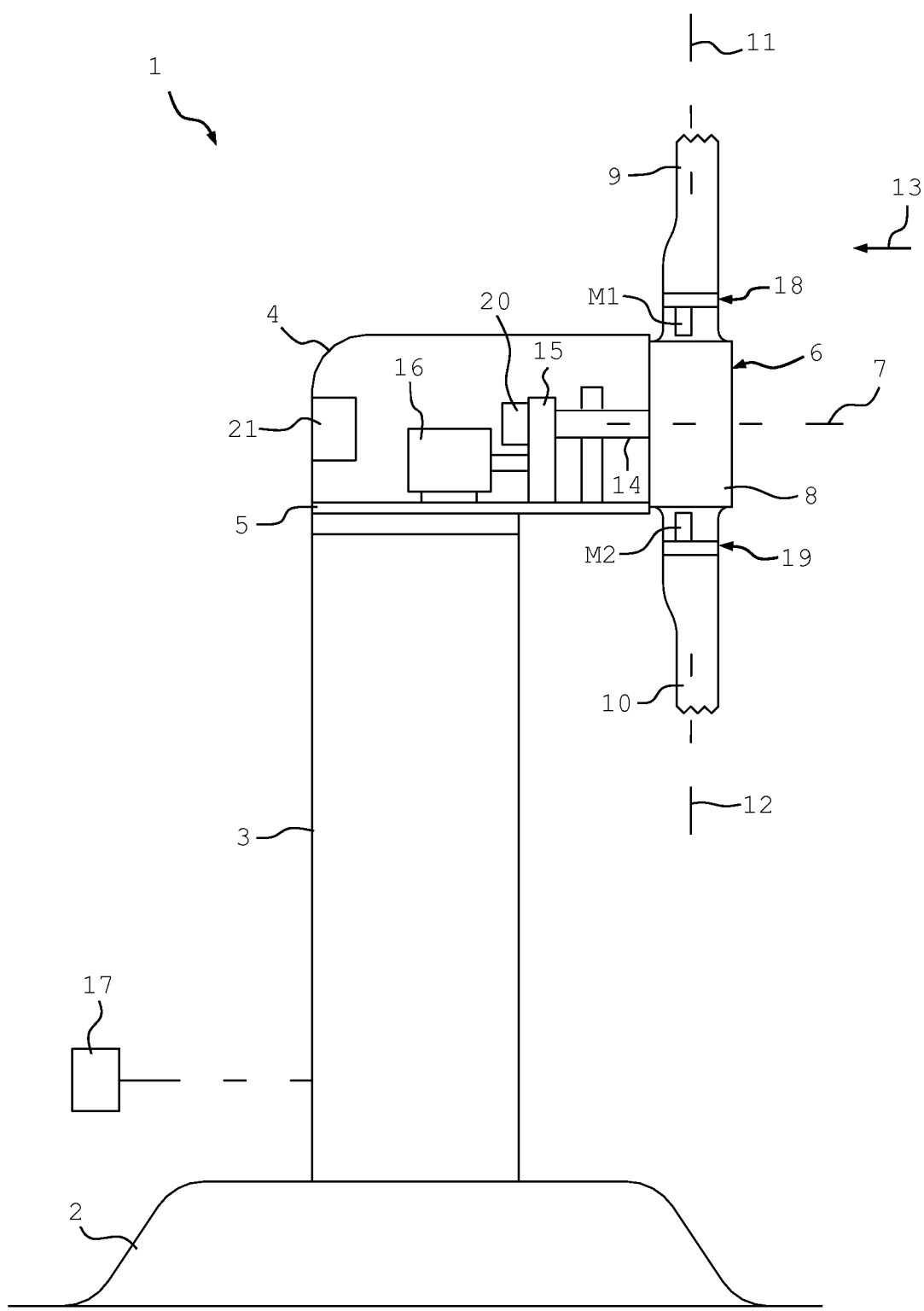
Figure 6:
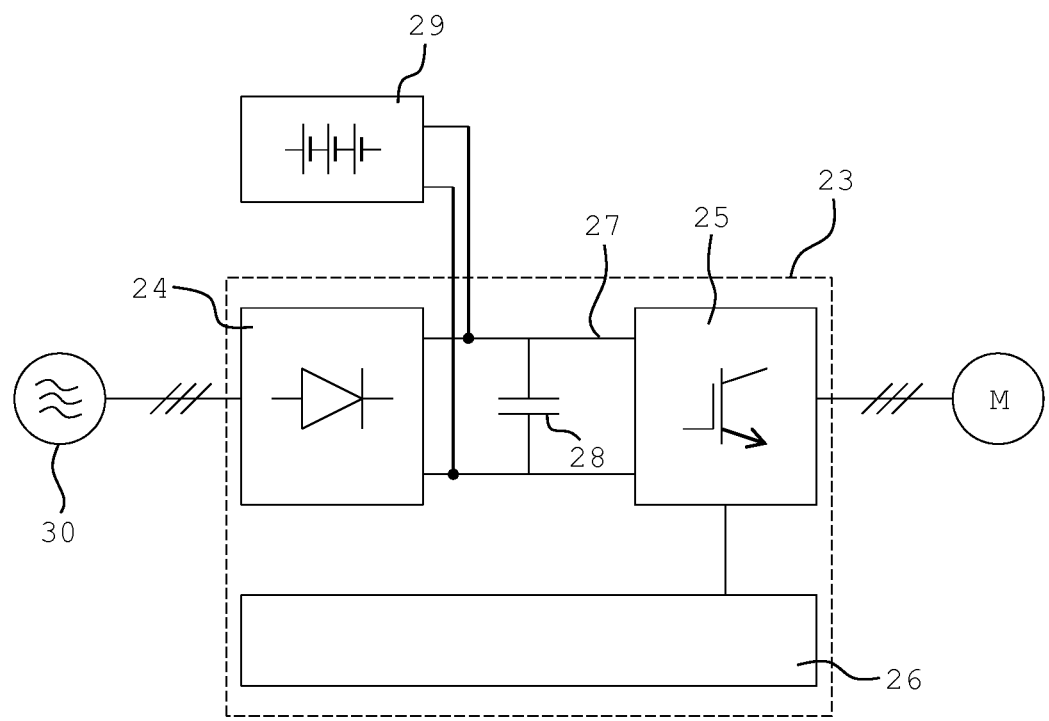

A plurality of embodiments of the invention are illustrated below in the drawings, in which:

FIGS. 1a to 1e are schematic views of various embodiments of the invention,

FIG. 2 is a longitudinal section of a first configuration of the two slip ring units without a pressure reduction device, FIG. 3 is a longitudinal section of a second configuration of the two slip ring units with a magnetically actuated pressure reduction device in the non-actuated state, FIG. 4 shows the arrangement according to FIG. 3 with the pressure reduction device in the actuated state, FIG. 5 is a schematic view of a wind turbine having a pitch system according to the invention, FIG. 6 is a schematic view of a convertor.

FIG. 1a shows a pitch drive of a pitch system according to a first embodiment of the invention, an electric motor M which is mechanically coupled to a rotor blade B1 being able to be electrically connected to a convertor by means of a first series connection comprising a switch S and a first rotary feedthrough Se1. The electric motor M can further be electrically connected to the convertor by means of a second series connection comprising a switch and a second rotary feedthrough Se2, the second series connection being arranged parallel with the first series connection. Using the switches, the electric motor M can consequently be electrically connected to the convertor optionally by means of the first rotary feedthrough Se1 or by means of the second rotary feedthrough Se2. The rotary feedthroughs Se1 and Se2 are preferably each constructed as a slip ring unit. In particular, the rotary feedthroughs form a slip ring arrangement.

If one of the rotary feedthroughs is defective, the electric motor M can be electrically connected to the convertor by means of the other rotary feedthrough.

The rotary feedthroughs define a mechanical separation location of the pitch drive so that the electric motor M and the switches are arranged in a rotating portion of the wind turbine and the convertor is arranged in a fixed region of the wind turbine, for example, in the machine housing. The rotor blade B1 can be rotated by means of the electric motor M about a blade axis which is associated with the rotor blade.

Figure 1B:
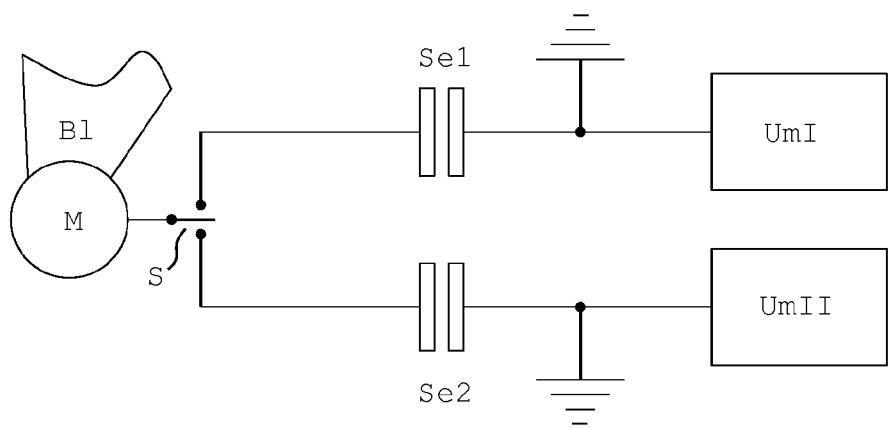

FIG. 1b shows a pitch drive of a pitch system according to a second embodiment of the invention, an electric motor M which is mechanically coupled to a rotor blade B1 being able to be electrically connected optionally to a first rotary feedthrough Se1 or a second rotary feedthrough Se2 by means of a switch S which is constructed as a change-over switch. The first rotary feedthrough Se1 is electrically connected to a first convertor UmI, and the second rotary feedthrough is electrically connected to a second convertor UmII. By means of the switch S, the electric motor M can consequently be electrically connected optionally to the first convertor UmI by means of the first rotary feedthrough Se1 or electrically connected to the second convertor UmII by means of the second rotary feedthrough Se2. The rotary feedthroughs Se1 and Se2 are preferably each constructed as a slip ring unit. In particular, the rotary feedthroughs form a slip ring arrangement.

If one of the rotary feedthroughs is defective, the electric motor M can be electrically connected to the convertor associated therewith by means of the other rotary feedthrough. If one of the convertors is defective, the electric motor M can be electrically connected to the other convertor by means of the rotary feedthrough which is associated with the other convertor. The rotor blade B1 can be rotated by means of the electric motor M about a blade axis which is associated with the rotor blade.

Figure 1C:
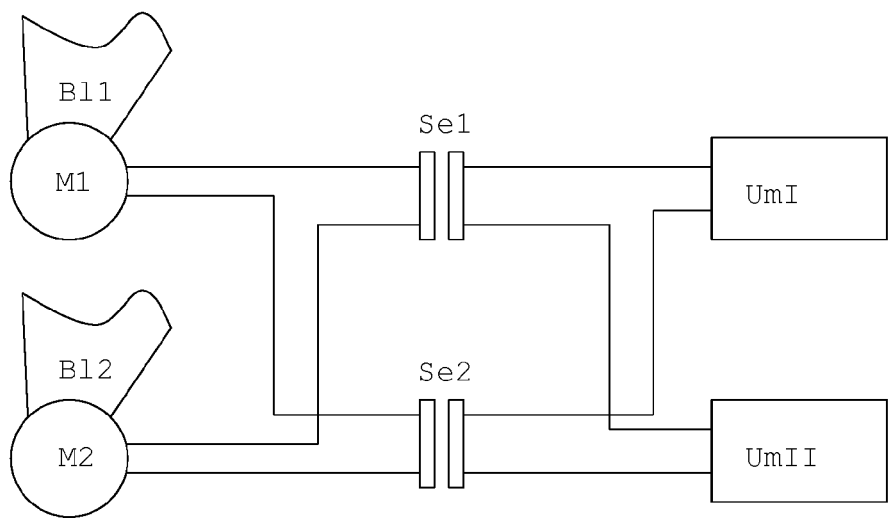

FIG. 1c shows a pitch system according to a third embodiment of the invention, two electric motors M1 and M2 each being mechanically coupled to a rotor blade B11 or B12. Each of the rotor blades can be rotated about a blade axis which is associated with the respective rotor blade by means of the respective electric motor. Furthermore, two rotary feedthroughs Se1 and Se2 and two convertors UmI and UmII are provided, each of the electric motors being able to be electrically connected to each of the convertors by means of each of the rotary feedthroughs. The electric motor M1 and the convertor UmI are associated with each other. Furthermore, the electric motor M2 and the convertor UmII are associated with each other. The rotary feedthroughs Se1 and Se2 are preferably each constructed as a slip ring unit. In particular, the rotary feedthroughs form a slip ring arrangement.

If one of the rotary feedthroughs is defective, each of the electric motors can be electrically connected to the associated convertor by means of the other rotary feedthrough. If one of the convertors is defective, each of the electric motors can be electrically connected to the other convertor by means of each of the rotary feedthroughs. For the selection of the rotary feedthrough to be used and/or the convertor(s) to be used, appropriate switching elements are particularly provided.

Figure 1D:
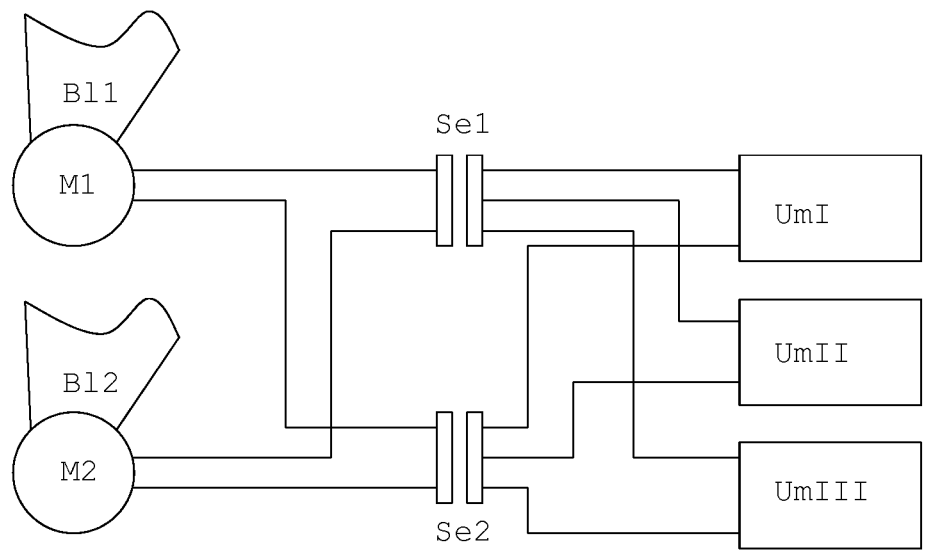

FIG. 1d shows a pitch system according to a fourth embodiment of the invention, two electric motors M1 and M2 each being mechanically coupled to a rotor blade B11 or B12. Each of the rotor blades can be rotated about a blade axis which is associated with the respective rotor blade by means of the respective electric motor. Furthermore, two rotary feedthroughs Se1 and Se2 and three convertors UmI, UmII and UmIII are provided, each of the electric motors being able to be electrically connected to each of the convertors by means of each of the rotary feedthroughs. The electric motor M1 and the convertor UmI are associated with each other. Furthermore, the electric motor M2 and the convertor UmII are associated with each other. The convertor UmIII is provided as a reserve. The rotary feedthroughs Se1 and Se2 are preferably each constructed as a slip ring unit. In particular, the rotary feedthroughs form a slip ring arrangement.

If one of the rotary feedthroughs is defective, each of the electric motors can be electrically connected to the associated convertor in each case by means of the other rotary feedthrough. If one of the convertors which is associated with one of the electric motors is defective, this electric motor can be electrically connected to the convertor UmIII provided as a reserve by means of each of the rotary feedthroughs. If two of the convertors are defective, each of the electric motors can be electrically connected to a third of the convertors by means of each of the rotary feedthroughs. For the selection of the rotary feedthrough to be used and/or the convertor(s) to be used, appropriate switching elements are particularly provided.

Figure 1E:
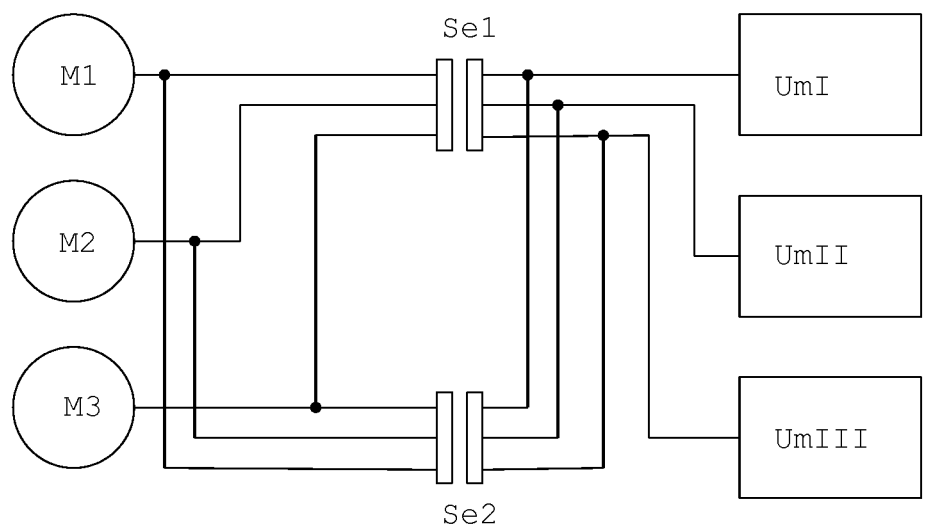

FIG. 1e shows a pitch system according to a fifth embodiment of the invention, there being provided three electric motors M1, M2 and M3 which are each in particular mechanically coupled to a rotor blade. Preferably, each of the rotor blades can be rotated about a blade axis associated with the respective rotor blade by means of the respective electric motor. Two rotary feedthroughs Se1 and Se2 and three convertors UmI, UmII and UmIII are further provided, each of the electric motors being able to be electrically connected to each of the convertors by means of each of the rotary feedthroughs. The electric motor M1 and the convertor UmI are associated with each other. Furthermore, the electric motor M2 and the convertor UmII are associated with each other. Finally, the electric motor M3 and the convertor UmIII are associated with each other. The rotary feedthroughs Se1 and Se2 are preferably each constructed as a slip ring unit. In particular, the rotary feedthroughs form a slip ring arrangement.

If one of the rotary feedthroughs is defective, each of the electric motors can be electrically connected to the associated convertor by means of the other rotary feedthrough.

If one of the convertors is defective, the electric motor associated therewith can be electrically connected to another of the convertors by means of each of the rotary feedthroughs. If two of the convertors are defective, the electric motors which are associated therewith can be electrically connected to a third of the convertors by means of each of the rotary feedthroughs. For the selection of the rotary feedthrough to be used and/or the convertor(s) to be used, appropriate switching elements are particularly provided.

FIG. 2 is a longitudinal section of a first configuration of a slip ring arrangement 20 which comprises two slip ring units Se1 and Se2 and which can form each of the rotary feedthrough pairs or slip ring arrangements which can be seen in FIGS. 1a to 1e. The slip ring arrangement 20 is surrounded by an outer housing 100 having protection type IP-67, which is provided to protect against water and dirt. The slip ring unit Se1 comprises a stationary portion 200 with a housing 210 and the slip ring unit Se2 comprises a stationary portion 300 with a housing 310. Between the housings 210 and 310, there is provided a gap 110 in which there is arranged a partition wall 730 which particularly serves to ensure that no dust particles can fall from the slip ring units Se1 and Se2 into the housing 100. Furthermore, the partition wall 730 prevents these particles from being able to be introduced from the housing 210 into the adjacent housing 310 and vice versa.

The stationary portion 200 comprises contact arms 250 which are guided on slip rings 500 and which are in electrical contact therewith. The slip rings 500 form a rotating portion of the first slip ring unit Se1. A line connection 520 of a slip ring of the slip rings 500 is guided through an external line guide 700 which is constructed in the form of a first sleeve and which is provided for all the line connections of the slip rings 500. In this context, the line connection 520 represents the line connections of the slip rings 500. The line guide 700 is mechanically and electrically completely separated from an inner line guide 720. Furthermore, the slip ring units Se1 and Se2 have a different spacing with respect to the rotor of the wind turbine (not illustrated in FIG. 2). Any electrical short-circuit or inadmissible heating or fire in the guide 700 does not damage the lines in the other guide 720.

The stationary portion 300 comprises contact arms 350 which are guided from the stationary portion 300 to slip rings 600 and which are in electrical contact therewith. The slip rings 600 form a rotating portion of the slip ring unit Se2. A line connection 620 of the slip ring unit 600 is guided through the inner line guide 720 which is constructed in the form of a sleeve which is arranged coaxially relative to the outer line guide 700.

FIG. 3 and FIG. 4 show a second embodiment of the slip ring arrangement 20 which is a variant of the configuration which can be seen in FIG. 2, the differences relating only to the stationary portion 300 of the second slip ring unit Se2 which additionally comprises a magnetically actuated pressure reduction device 22.

The contact arms 350 are mechanically connected to each other by means of a contact bank 355, the stationary portion 300 additionally having two electromagnets 360 and 360' by means of which the contact bank 355 can be attracted. When the magnets (see FIG. 4) are activated, the contact bank 355 is attracted upwards so that the pressure between the contact arms 350 and the slip rings 600 is reduced. Although the electrical contact resistance at the slip rings increases under the reduced pressure, the friction is reduced so that, owing to the pressure reduction, the service-life of the slip rings 600 and the contact arms 350 can be extended. With appropriate sizing of the magnets, the slip rings are consequently in a "standby mode" when they are activated.

In the normal operating method, the second slip ring unit Se2 is not active during the pressure reduction. For safety reasons, a return device in the form of a helical spring 362 presses the contact bank 355 back to the full contact pressure in the event of a voltage or magnetisation drop. The second slip ring unit Se2 is consequently fully activated as soon as the first slip ring unit Se1 has failed.

For further description of the second embodiment of the slip ring arrangement, reference is made to the description of the first embodiment of the slip ring arrangement.

FIG. 5 is a schematic illustration of a wind turbine 1 which comprises a tower 3 which rests on a base 2 and at the end of which facing away from the base 2 a machine housing 4 is arranged. The machine housing 4 has a machine carrier 5 on which a rotor 6 is supported so as to be able to be rotated about a rotor axis 7 and comprises a rotor hub 8 and a plurality of rotor blades 9 and 10 which are connected thereto and which are each supported on the rotor hub 8 so as to be able to be rotated about a blade axis 11 or 12. The rotor blades 9 and 10 extend in the direction of their blade axes 11 and 12 away from the rotor hub 8, the blade axes 11 and 12 extending transversely relative to the rotor axis 7.

The rotor 6 is rotated by wind 13 about the rotor axis 7 and comprises a rotor shaft 14 which, with a gear mechanism 15 being interposed, is coupled to an electrical generator 16 which is driven by the rotor 6. The generator 16 produces electrical energy and supplies it to an electrical network 17. The rotor blades 9 and 10 can each be rotated about their respective blade axis relative to the rotor hub 8 by means of a pitch drive 18 or 19, respectively. Furthermore, the rotor 6 may comprise a third rotor blade, which is rotatably supported on the rotor hub 8 about a blade axis which extends transversely relative to the rotor axis 7, extends away from the rotor hub 8 in the direction of this blade axis and can be rotated relative to the rotor hub 8 about this blade axis by means of a pitch drive. The rotor blades are arranged in a state distributed around the rotor axis 7 in a uniform manner so that two adjacent blade axes each enclose an angle of 180° in the case of two rotor blades, or 120° in the case of three rotor blades. Each of the pitch drives comprises at least one convertor and an electric motor which is connected electrically, by means of a slip ring arrangement 20 which is mechanically coupled to the rotor shaft 14, to the respective convertor which is arranged in a control device 21 in the machine housing 4. In FIG. 5, the electric motors M1 and M2 of the pitch drives 18 and 19 are illustrated schematically.

For example, each of the pitch drives is formed by means of one of the pitch drives which can be seen in FIGS. 1*a* and 1*b*. Alternatively, however, the pitch drives may also form a pitch system according to FIGS. 1*c* to 1*e*. The slip ring arrangement 20 comprises in particular rotary feedthroughs according to FIGS. 1*a* to 1*e* and preferably forms a slip ring arrangement according to FIG. 2 or according to FIGS. 3 and 4.

FIG. 6 is a schematic illustration of a convertor 23 by means of which each of the convertors according to FIGS. 1*a* to 1*e* and/or each of the convertors mentioned in the description of FIG. 5 can be formed. The convertor 23 comprises a rectifier 24 and a power control unit 25 which is connected downstream thereof and downstream of which an electric motor M is connected, and which is controlled by means of a control system 26. The rectifier 24 and the power control unit 25 are electrically connected to each other by means of a direct current intermediate circuit 27 which comprises an intermediate circuit capacitor 28. Furthermore, an emergency power supply device 29, which in one form may comprise an uninterruptible power supply, is electrically connected to the intermediate circuit 27. The rectifier 24 is supplied with electrical power by means of a power supply 30, for example, from an electrical network, with a single-phase or multi-phase alternating current, converts this into direct current and supplies this direct current to the intermediate circuit 27. The power control unit 25 receives direct current from the intermediate circuit 27 and converts it depending on the control system 26 either into single-phase or multi-phase alternating current or into pulsed direct current and supplies this converted current to the electric motor M. Whether a single-phase or multi-phase alternating current or a pulsed direct current is emitted by the power control unit 25 is dependent on whether the electric motor M is a single-phase or multi-phase alternating current motor or a direct current motor.

The convertor 23 is in particular used in the wind turbine 1 according to FIG. 5. For example, the convertor 23 is arranged in the machine housing 4. According to an alternative, the rectifier 24 is arranged in the machine housing 4 and the power control unit 25 in the rotor 6. In this instance, the intermediate circuit 27 is guided via the slip ring arrangement 20. The control system 26 may be arranged in the machine housing 4 or in the rotor 6. The same applies to the emergency power supply device 29.

The invention claimed is:

1. A pitch system for a wind turbine comprising a plurality of rotor blades and an electrically-driven pitch drive associated with one of the rotor blades,
said electrically-driven pitch drive having an electric motor arranged in a rotating portion of the wind turbine for blade adjustment, a power and control unit associated with the electric motor, and all of a first plurality of line connections contained entirely within a first rigid tubular sleeve for transmitting energy and control data between the power and control unit and the motor, the first plurality of line connections being guided via a first rotary feedthrough arranged at a connection location between the rotating portion of the turbine and an axially adjacent fixed region, and a second rotary feedthrough functioning independently from the first rotary feedthrough which is selectively connectable to the power and control unit and the motor in order to maintain reliable transmission of the energy and control data in the event of a failure of the first rotary feedthrough, the second rotary feed through communicating with a second plurality of line connections extending within a second rigid tubular sleeve disposed coaxially with the first rigid tubular sleeve, such that all of the second plurality of line connections are contained within an interior area of the second rigid tubular sleeve and therefore isolated mechanically and electrically from the first plurality of line connections.

2. The pitch system of claim 1 wherein the first and second pluralities of line connections are associated with the first rigid tubular sleeve and the second rigid tubular sleeve, respectively, and wherein both of the first and second rigid tubular sleeves are disposed between the motor and the power and control unit, and the first and second rigid tubular sleeves are independent from one another.

3. The pitch system of claim 1 wherein the first and second rotary feedthroughs are arranged in a parallel manner beside each other.

4. The pitch system of claim 1 wherein the first and second rotary feedthroughs are arranged coaxially with spacing from each other.

5. The pitch system of claim 1 wherein the first and second feedthroughs are arranged axially one behind the other in series and with spacing from each other.

6. The pitch system of claim 1 wherein the first and second rotary feedthroughs are arranged in an adjacent manner axially one behind the other and are surrounded by a common housing.

7. The pitch system of claim 1 wherein each of the first and second rotary feedthroughs comprises a slip ring unit having an individual housing, a slip ring and a contact arm, and where the contact arm is operable to be pressed onto the slip ring in order to transmit the energy and control data.

8. The pitch system according to claim 7 wherein at least one of the slip ring units further comprises a pressure reduction device on the slip ring for adjusting a pressing force of the contact arm.

9. The pitch system according to claim 8 wherein the pressure reduction device is selected from the group consisting of a magnetic device and an electromagnetic device which, in the absence of at least one of an energy signal and a control signal, enables a contact pressure applied by the contact arm to be controlled for selectively forming and interrupting electrical contact between the contact arm and the slip ring.

10. The pitch system according to claim 9, wherein the pressure reduction device is constructed in such a manner that, in the event of a voltage drop or a magnetization drop in the line connection between the motor and the power and control unit, there is produced a contact pressure of the contact arm which produces the electrical contact.

11. The pitch system claim 1 wherein the first rotary feedthrough is supported on the first tubular sleeve and the second rotary feedthrough is supported on the second tubular sleeve, the latter being arranged coaxially with respect to the former, and wherein one of a line inlet and a line outlet of the first rotary feedthrough is carried out in a radially extending external annular space formed by a diameter difference between the first and second tubular sleeves, and the other of the line inlet and the line outlet is carried out in the radial inner space of second tubular sleeve.

12. The pitch system of claim 1 wherein the power and control unit further comprises an uninterruptible power supply.

13. The pitch system of claim 1 wherein a rotating portion of the pitch drive has only one electric motor and the associated power and control unit is arranged in the fixed region, and
wherein a switching device connects the associated power and control unit to one of the two rotary feedthroughs.

14. The pitch system according to claim 13 further comprising an emergency power supply associated with the power and control device, which is connected to an independent energy source.

15. The pitch system of claim 1 wherein the power and control unit further comprises a convertor.

16. The pitch system of claim 15 wherein the convertor comprises at least a rectifier and a power control unit.

17. The pitch system of claim 16 wherein the power control unit is arranged directly on the motor, and wherein the rectifier and an emergency power supply device are arranged in the fixed region.

18. The pitch system of claim 1, wherein the power and control unit comprises a first power and control unit and a second power and control unit, and wherein in the event of failure of the first power and control unit, the second power and control unit is switchably connected to the motor of the power and control unit.

19. The pitch system according to claim 18 wherein the first power and control unit and the second power and control unit are each constructed as a convertor.

20. The pitch system of claim 1, wherein the power and control unit comprises first, second and third power and control units, and wherein the system further comprises second and third motors, such that the first plurality of line connections are guided via the first rotary feedthrough, and the second plurality of line connections includes three additional line connections which are guided via the second rotary feedthrough and which are switchably connected to each of the motor, the second motor and the third motor.

21. The pitch system according to claim 20 wherein the first, second and third power and control units are each constructed as an independent convertor.

22. A wind turbine having the plurality of rotor blades and a pitch system according to claim 1.

23. A pitch system for a wind turbine having a plurality of rotor blades and at least one electrically-driven pitch drive associated with one of the rotor blades, the electrically-driven pitch drive comprising:
an electric motor arranged in a rotating portion of the wind turbine for blade adjustment;
a power and control unit associated with the electric motor;
line connections for transmitting energy and control data between the power and control unit and the motor;
the line connections being guided via a first rotary feedthrough arranged at a connection location between the rotating portion of the wind turbine and an axially adjacent fixed region, and a second rotary feedthrough functioning mechanically and electrically separately independently from the first rotary feedthrough which is selectively connectable to the power and control unit and the motor in order to maintain reliable transmission of the energy and control data in the event of a failure of the first rotary feedthrough;
wherein the power and control unit further comprises a convertor;
wherein the convertor comprises at least a rectifier and a power control unit;
wherein the power control unit is arranged directly on the motor; and
wherein the rectifier and an emergency power supply device are arranged in the axially adjacent fixed region.

* * * * *